Figure 1:
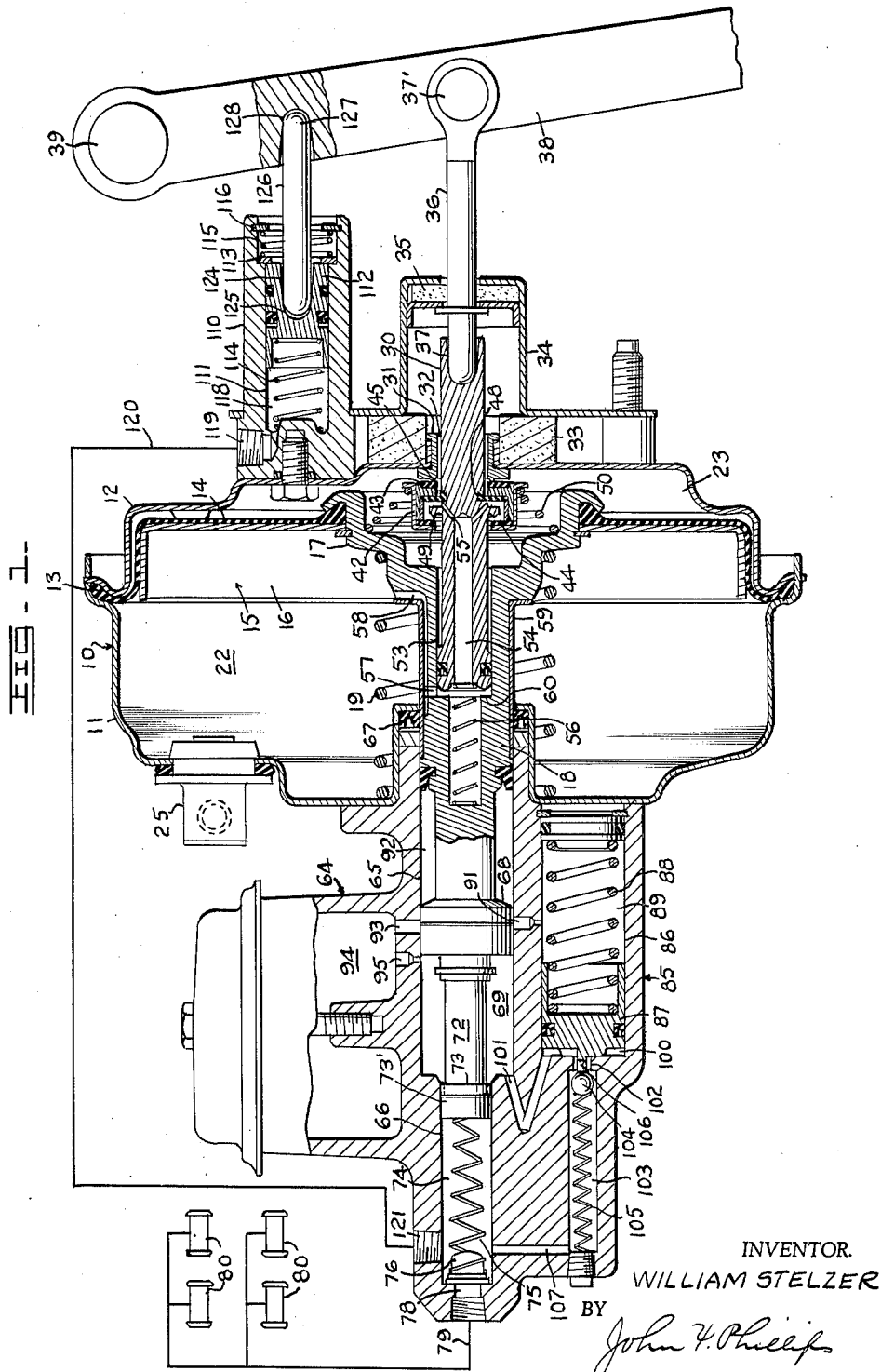

Dec. 14, 1965  W. STELZER  3,222,868
BRAKE OPERATING MECHANISM
Filed Feb. 8, 1963  2 Sheets-Sheet 1

INVENTOR.
WILLIAM STELZER
BY John H. Phillips
ATTORNEY

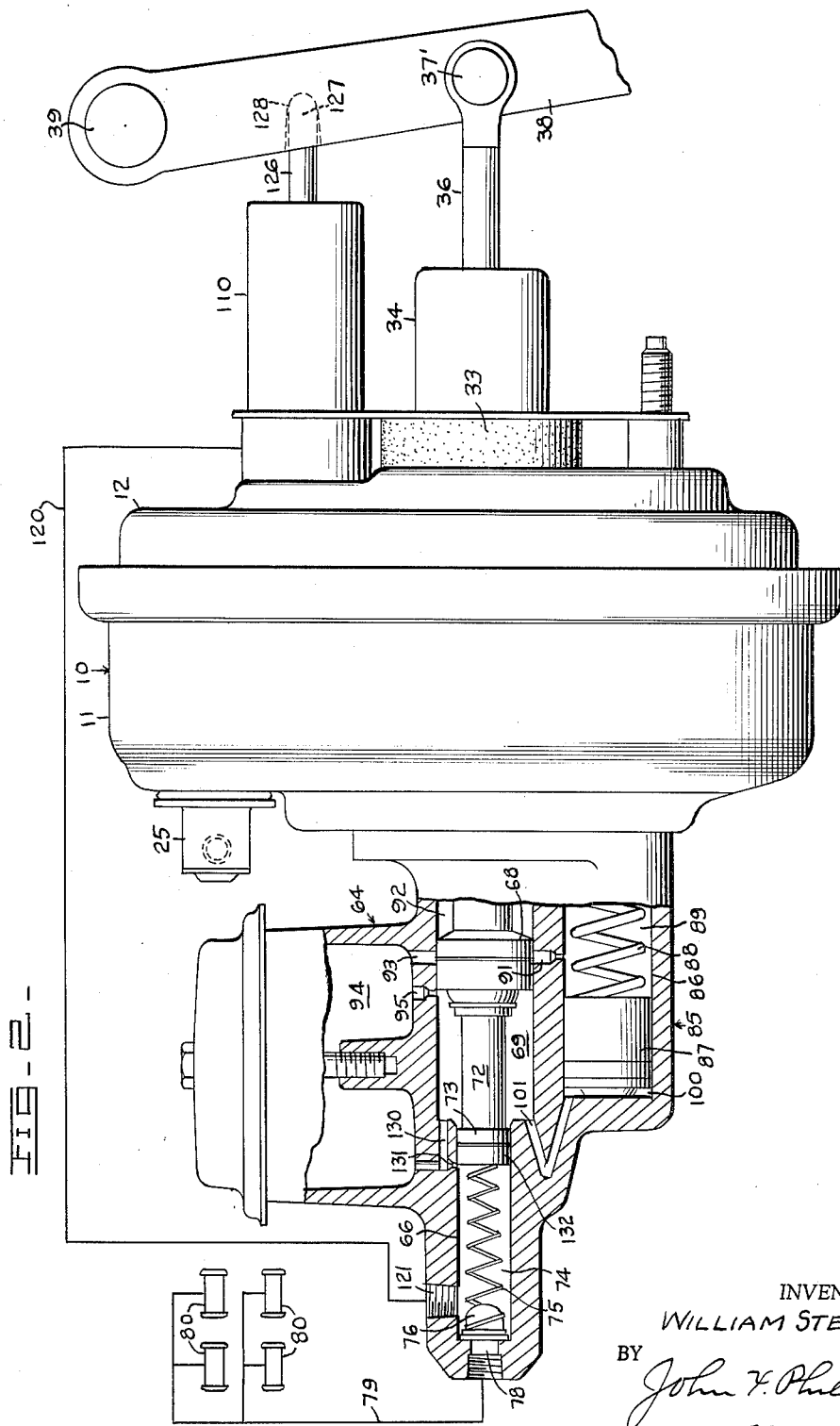

United States Patent Office 3,222,868
Patented Dec. 14, 1965

3,222,868
BRAKE OPERATING MECHANISM
William Stelzer, Bloomfield Hills, Mich., assignor to Kelsey-Hayes Company, Romulus, Mich., a corporation of Delaware
Filed Feb. 8, 1963, Ser. No. 257,284
11 Claims. (Cl. 60—54.6)

This invention relates to a brake operating mechanism for the hydraulic brakes of a motor vehicle, and has particular reference to a master cylinder and power unit and the control means associated therewith.

It is well known to provide a vehicle brake system with a two stage or compound master cylinder in the first stage of which hydraulic fluid is displaced at a relatively rapid rate and at relatively low pressures to take up the play between the brake shoes and the brake drums, and to provide a second stage wherein volumetric displacement is at a lower rate but at a higher pressure to provide the substantial pressure increases necessary for full brake application. It is also relatively common practice to provide fluid pressure motors for operating master cylinders in which two stages of reaction are provided for transmission to the brake pedal, the second stage of reaction substantially increasing resistance to movement of the brake pedal as substantial brake application is effected. In such mechanisms, there is an undesirable "feel" in the brake pedal as the transition takes place between the two stages of reaction.

An important object of the present invention is to combine a two stage master cylinder with a novel type of motor mechanism having associated therewith novel means for transmitting reaction to the brake pedal in such a manner as to provide the brake pedal with true "feel" similar to a manually operated master cylinder, thus eliminating the undesirable "feel" which normally is obtained through the operation of a two stage master cylinder.

A further object is to provide such a mechanism wherein a reaction cylinder is provided with a piston having mechanical connection with the brake pedal and which is provided with a counter reaction spring to delay the transmission of reaction to the brake pedal until substantial brake operating pressures are built up.

A further object is to so improve the two stage master cylinder as to obtain a gradual transition from the first stage while increasing the pressure generated and at the same time decreasing the output volume.

A further object is to provide a two stage master cylinder having respectively relatively high and low volumetric output plungers, and to provide novel means for rendering the high output plunger inoperative after the brake shoes have engaged the drums and higher pressures are developed by the other plunger without providing a lumpy operation at such transition point.

A further object is to reduce the power requirement for operation of the master cylinder so that a certain pressure may be produced with a smaller motor mechanism when operating under power, and with less manual effort in the case of a power failure, since the two stage or compound master cylinder is in itself a pressure boosting device.

Other objects and advantages of the invention will become apparent during the course of the following description.

In the drawings I have shown two embodiments of the invention. In this showing

FIGURE 1 is an axial sectional view through the motor mechanism and master cylinder showing the connection of the motor parts with the brake pedal, the wheel cylinders and the piping connections to such wheel cylinders and to the reaction cylinder being diagrammatically represented, and FIGURE 2 is a similar view showing a modified form of the invention, the motor and associated parts being shown in elevation.

Referring to FIGURE 1, the numeral 10 indicates a fluid pressure motor as a whole, shown in the present instance as a vacuum suspended motor, as will become apparent. The motor comprises a pair of casing sections 11 and 12 between which is clamped the periphery 13 of a diaphragm 14. The diaphragm forms part of a pressure responsive unit indicated as a whole by the numeral 15 and further comprising a flanged plate 16 fixed to a hub 17 to which the inner periphery of the diaphragm 14 is also secured. The hub 17 carries an axial extension 18, further referred to below, and a spring 19 biases the pressure responsive unit 15 to the off position shown.

The pressure responsive unit divides the motor casing to form a constant pressure chamber 22 and a variable pressure chamber 23. These chambers are normally connected to each other by a valve mechanism to be described, and the chamber 22 is in fixed communication through a fitting 25 with a suitable source of vacuum.

A control rod 30 operates in a guide 31 carried by the casing section 12 and having grooves 32 communicating with the atmosphere through an air cleaner 33, through which air is filtered to flow into the chamber 23 upon operation of the valve mechanism described below. The filter 33 is retained in position by a housing 34 in the outer end of which is arranged dust guard 35 in which is movable a push rod or link 36 having mechanical engagement as at 37 with the push rod 30. The outer end of the push rod 36 is pivoted as at 37' to a conventional depending brake pedal 38, pivotally supported at its upper end in any suitable manner as at 39.

Within the hub 17 is arranged a valve body 42 carrying at one end an air valve seat 43 and at its other end a vacuum seat 44. The valve seat 43 normally engages a valve 45 formed on the inner end of the guide sleeve 31, thus normally disconnecting the motor chamber 23 from the atmosphere. The valve body 42 is sealed relative to the control rod 30 by a supporting diaphragm 48. The control rod 30, intermediate its ends, is provided with an annular valve 49 engageable with the seat 44, but normally disengaged therefrom. A spring 50 biases the valve body 42 to the right to normally maintain engagement of the valve elements 43 and 45.

The inner or left hand end of the control rod 30 slides within and in sealed engagement with a bore 53 formed in the extension 18. Such inner end of the rod 30 is provided with an axial passage 54 communicating through ports 55 with the space behind the valve 49. A spring 56 biases the rod 30 to its normal off position, as shown. The left hand extremity of the passage 54 communicates through one or more ports 57, with an external groove 58 formed in the extension 18 and normally covered by thin metal shield 59, preferably formed of stainless steel, for a purpose which will become apparent. The left hand end of the bore 53 terminates in a shoulder 60 for a purpose to be described.

A master cylinder indicated as a whole by the numeral 64 is fixed in any suitable manner to the motor housing 11 and is provided therein with two relatively larger and smaller bores 65 and 66 respectively. The extension 18 slides in the right hand end of the bore 65 through a sealing unit 67, and the extension 18 is shown as being provided with an integral pressure generating plunger 68 slidable in the bore 65. The bore 65, to the left of the plunger 68, forms a chamber 69 from which fluid is displaced in a manner to be described.

To the left of the plunger 68, the extension 18 is provided with a reduced further extending portion 72 carrying a plunger 73, including a conventional cup 73', slidable in the bore 66. This bore forms with the plunger 73 a relatively high pressure chamber 74. A spring 75 is arranged in this chamber and engages at opposite ends against plunger 73 and a residual pressure valve 76. Fluid from the chamber 74 flows through a port 78 and through hydraulic lines 79 to the wheel cylinders 80 of the vehicle.

Beneath the master cylinder is an accumulator indicated as a whole by the numeral 85. This accumulator is provided with a bore 86 in which is slidable a plunger 87 biased to the left to off position by a spring 88. The bore 86 forms a chamber 89 to the right of the plunger 87, and this chamber communicates through a port 91 with the chamber 92 formed to the rear of the plunger 68, and such chamber communicates through a port 93 with a conventional reservoir 94. Such reservoir communicates through the usual replenishing port 95 with the chamber 69.

To the left of the plunger 87 is formed a chamber 100 communicating through a passage 101 with the chamber 69. The chamber 100 normally communicates through a port 102 with a passage 103 coaxial with the plunger 87. The port 102 is adapted to be closed under conditions described by a ball valve 104. This valve is biased towards closed position by spring 105, and is normally held open by a projection 106 carried by the plunger 87, as shown in FIGURE 1. The passage 103 is in fixed communication with the chamber 74 through a passage 107.

A reaction cylinder 110 is arranged eccentric to the axis of the motor 10 and is fixed to the motor casing 12. This cylinder is provided with a bore 111 in which is slidable a piston 112, biased to off position against a slidable stop ring 113 by a spring 114. A stronger counter reaction spring 115 engages at one end against the ring 113 and at its opposite end against a fixed snap ring 116. The ring 113 is slidable to the right upon movement of the piston 112, in a manner to be described. To the left of the piston 112 the bore 111 forms a chamber 118 communicating through a port 119 with one end of a hydraulic line 120, the other end of which communicates with the master cylinder chamber 74 through a port 121.

The right hand end of the plunger 112 is provided with a socket 124, having a hemispherical inner end engageable with but normally spaced as at 125 from a push rod 126. The rounded other end 127 of such rod engages in a socket 128 formed in the brake pedal 38.

In FIGURE 2 of the drawings a modified form of the invention is shown in which all of the same advantages are present and the same operation takes place except for a slight difference which occurs in the releasing of the operating parts and their return to normal position. Inasmuch as the device in FIGURE 2 is identical except for two changes, with the mechanism in FIGURE 1, the motor has been shown in elevation and the same numerals have been applied to identical parts. It will be noted that the passage 101 in FIGURE 2 connects the chamber 69 to the chamber 100. However, the ball valve 104 and associated parts have been eliminated. Since in FIGURE 1 the parts referred as having been eliminated are depended upon to replenish fluid in the chamber 74, a replenishing passage 130 affords communication between the chamber 69 and the chamber 74 to replenish fluid in the latter, the passage 130 including a port 131. This port communicates with the chamber 74 just ahead of the plunger 73, which plunger is provided with the usual flexible flanged seal 132 which functions in a manner to be described in the operation of the mechanism.

Operation

The parts normally occupy the positions shown in FIGURE 1, the valve elements 43 and 45 being closed to disconnect the motor chamber 23 from the atmosphere. The motor chamber 22, in the present embodiment of the invention, is always connected to a source of vacuum through the connector 25. This vacuum will be communicated through passage 58, port 57, passages 54 and 55 to the chamber 23 around the normally open valve 49. Accordingly, the piston 15 of the motor will be normally vacuum suspended and the piston will be maintained in its off position by the spring 19. There is an appreciable gap forming a lost-motion connection between the shoulder 60 and the adjacent end of the control rod 30 within the limits of which the valve mechanism is operable upon depression of the brake pedal 38. There is a gap 125 forming a lost-motion connection between the left hand end of the rod 126 and the socket 124 to provide for valve operation without the transmission of force to the piston 112.

The brakes are applied by depressing the brake pedal 38 to move the push rod 36 and control rod 30. This movement closes the valve 49, thus disconnecting the motor chambers 22 and 23. Slight further movement of the brake pedal transmits movement through the valve seat 44 to the valve body 42 to open the valve seat 43 and thus admit air through the air cleaner 33 and grooves 32 to the motor chamber 23. Thus the motor piston 15 will be subjected to differential pressures to move it to the left to actuate the master cylinder plungers 68 and 73. Such plunger movement displaces fluid from the chambers 69 and 74 to the wheel cylinders 80 through lines 79. Obviously, because of the effective area of the plunger 68, the volumetric displacement from the chamber 69 is at a more rapid rate than from the chamber 74. This volume differential is taken care of past the cup 73' and through the passage 101, chamber 100 and port 102, the valve 104 being held normally open by the stem 106.

Pressure in the chamber 74 is communicated through the line 120 to the reaction chamber 118, but pressure at this time will not move the piston 112 because of the loading of the reaction spring 115. Accordingly, no reaction force will be transmitted from the piston 112 to the brake pedal. It will be understood that the initial displacement of fluid to the wheel cylinders moves the brake shoes toward engagement with the drums, and this does not require the generation of substantial pressure.

During the first stage of operation, increased pressure in the reaction chamber 118 overcomes the loading of the counter reaction spring 115. The piston 112 moves to the right, carrying with it the ring 113, and transmits a force through the push rod 126 to the brake pedal 38. Reaction transmitted to the brake pedal 38 is obviously accurately proportional to the hydraulic pressures operative for applying the brakes.

Upon contact of the brake shoes with the drums, there will be an immediate rise in pressure in the chambers 69 and 74 since very little fluid can be displaced into lines 79. Movement of the plunger 68 displaces fluid under higher pressure through the passage 101 into the chamber 100. The pressure increase referred to, also communicated to the chamber 100 from the chamber 74, acts against the plunger 87 of the accumulator 85, and the plunger 87 moves to the right against the loading of the spring 88. This spring is proportioned to yield after the brake shoes are well expanded and the second stage of operation is to begin. When the plunger 87 moves to the right, the spring 105 seats the ball 104, and the accumulator accommodates all of the fluid displaced from the chamber 69 without causing a substantial increase in pressure in the chamber 69.

The second stage of the operation thus takes place upon the closing of the ball valve 104 and during such second stage of operation, the force necessary to displace fluid from the chamber 74 remains practically the same. The total force which the motor mechanism must exert is the sum of the force required to displace fluid from the chamber 74 and the force required to displace fluid from the chamber 69 into the chamber 100 to overcome the spring 88. Since the plunger 73 is relatively small and is required in the second stage of operation to displace only a small volume of fluid, a smaller motor 10 is required to build up in the chamber 74 the pressure necessary for maximum brake application. So long as pressure is present in the source, the motor performs all of the work of applying the brakes, and the operator is called upon only to provide the slight force necessary to operate the brake pedal, the resistance encounter being only the resistance of the springs 50 and 56, and the reaction force of piston 112 to the right.

Since the excess fluid from the chamber 69 is accommodated by the accumulator 85, and since the spring 115 is progressively overcome, there will be a smooth transition from the first to the second stage of brake operation and a smooth transmittal of reaction to the brake pedal, thus eliminating the undeirable "feel" which would be normally obtained by operation of a two stage master cylinder. Thus a smoothly operating mechanism is provided in the second stage of operation in which there is a smooth increase in hydraulic braking pressures after the output volume is decreased, and a smaller motor is required for building up maximum braking pressures.

During the relasing of the pedal, the pressures and forces follow the same paths which they ascended, so that excellent controlability is obtained. Such controlability cannot be obtained wtih a two-stage master cylinder of known construction where a valve replaces the accumulator. When the pedal is released, the spring 56 returns the control rod 30 to normal position. Movement of the valve body 42 is arrested when the seat 43 engages the valve 45, and the valve 49 will move to open position, as shown. Thus the motor chamber 23 will be disconnected from the atmosphere and connected again to the chamber 22 to vacuum suspend the motor. The return spring 19 will move the pressure responsive unit 15 to its normal position and such movement is assisted by the spring 75 associated with the residual pressure valve 76, the function of which is well known. Such return movement, of course, is also assisted by pressure in the chamber 69 maintained by action of the spring 88, pressure in the chamber 69 decreasing only slightly during retractile movement of the plunger 68. It will be apparent that during the course of the foregoing operations the accumulator chamber 89 will be at atmospheric pressure since it communicates through port 91, chamber 92 and port 93 with the reservoir 94. As the spring 88 returns the plunger 87 to its normal position shown, fluid returns to the chamber 89 through the same path.

When the pedal is released, pressure in the chamber 69 drops as the plunger 68 is retracted, thus allowing the plunger 87 to return to normal position and open the valve 104. Thereafter, fluid returning from the brake lines will flow into the chamber 74 as the plunger 73 is retracted, and excess fluid flows through passages 107 and 103, chamber 100 and passage 101 into the chamber 69. This return flow of fluid from the brake lines provides for an extremely rapid releasing of the brakes.

The operation of the form of the invention in FIGURE 2 is substantially the same as that described in connection with FIGURE 1, except for the functioning of the ball valve 104 and associated elements. Immediately upon movement of the plunger 73 to the left when the motor 10 is energized, the port 131 will be closed. Displacement of fluid from the chamber 69 then takes place around the lip of the cup 132 into the chamber 74, this operation accomplishing the same result as the flow of fluid displaced from the chamber 69 in FIGURE 1 through port 102. It will be noted that the plunger 73 is conventional, the portion back of the cup 132 being grooved or of slightly smaller diameter than the bore 66, so that the flexing of the cup 132 bypasses fluid from the chamber 69 to the chamber 74.

After the second stage of operation is reached, that is when the spring 88 yields, the pressure rises in the chamber 74 in FIGURE 2, and prevents fluid at a lower pressure in the chamber 69 from flowing past the lip of the cup 132. Displacement from the chamber 69 is accommodated by the accumulator 85 in the manner described.

All of the other functions of the mechanism in FIGURE 2 are identcial with those described above as to the functioning of the motor 10, reaction piston 112, etc. There is a slight difference in the operation of the two mechanisms when the brake pedal is released. In FIGURE 1, complete and rapid return flow from the brake lines is provided as soon as the releasing of pressure in the chamber 69 and 100 permits the plunger 87 to return to normal position to open the bypass valve 104. In FIGURE 2, such bypass means is not provided, and while brake pressures are rapidly reduced when the brake pedal is released, it is necessary for the plunger 73 to return fully to the off position shown in FIGURE 2 before there will be a complete relieving of pressure from the chamber 74, through the port 131 and passage 130 into the chamber 69. At this point the chamber 69 is open to the reservoir 94 through the port 95. Thus the only difference in the two systems is that in FIGURE 2 there will be a slightly less rapid complete releasing of brake line pressures, whereas such pressures are very rapidly relieved with the system shown in FIGURE 1. Of course, in each system, the relieving of pressures in the chamber 74 relieves pressure in the reaction chamber 118 so that the counter-reaction spring 115 returns the ring 113 and piston 112 to their normal positions.

As previously stated, less force is required for the operation of the master cylinder plungers, thus allowing the use of a smaller motor 10. For the same reasons, less manual force is required for operating the brakes in the event of power failure. Under the latter condition, movement of the control rod 30 will fail to energize the motor. The control rod 30 will move through its normal valve operating range and will engage at its left hand end with the shoulder 60 to effect the foot operation of the plungers 68 and 73. Fluid also will be displaced from the reaction chamber 118. The push rod 126 is closer to the pivot 39 than is true of the pivot 37', and thus substantial leverage is provided for the foot operation of the piston 112. This piston is of larger diameter than the master cylinder plunger 73, but partakes of a much shorter stroke. The operator backs up the piston 112 against braking pressures. Thus in foot operation the piston 112 also provides pedal reaction. Since fluid is rapidly displaced from the chamber 69 at low pressure during initial pedal operation, and since the small size of the plunger 73 does not require great force for the generation of braking pressures in the chamber 74, the total pedal force necessary for brake operation is much less than is true with present booster brake mechanisms when a failure of power occurs.

It is to be understood that the forms of the invention shown and described are to be taken as preferred examples of the same and that various changes in the shape, size and arrangements of parts may be made as do not depart from the spirit of the invention or the scope of the appended claims.

I claim:

1. In a power unit to produce hydraulic pressure for hydraulic brakes, a fluid pressure motor, a master cylinder having a plunger directly connected to said motor to be actuated thereby, valve means to control differential pressure in said motor, manually operable means for operating said valve means, and a hydraulic reaction device separate from said motor and connected solely to said master cylinder to be directly subject solely to pressures in said master cylinder, said reaction device having mechanical engagement with said manually operable means to transmit reaction forces thereto proportional to pressures developed in said master cylinder.

2. In a power unit to produce hydraulic pressure for hydraulic brakes, a fluid pressure motor, a master cylinder having a plunger directly connected to said motor to be actuated thereby, valve means to control differential pressures in said motor, manually operable means for operating said valve means, and a hydraulic reaction device separate from said motor and connected solely to said master cylinder to be directly subject solely to pressures in said master cylinder, said reaction device having mechanical engagement witht said manually operable means to transmit reaction forces thereto proportional to pressures developed in said master cylinder, said manually operable means having lost motion connection with said plunger of said master cylinder within the limits of which lost motion said valve means is operable, said lost motion being taken up to transmit direct forces to said plunger of said master cylinder upon a failure of said valve means to establish differential pressures in said motor.

3. In a power unit to produce hydraulic pressure for hydraulic brakes, a differential pressure operable motor, a master cylinder having a plunger directly connected to said motor to be actuated thereby, valve means operable to establish differential pressures in said motor, manually operable means connected to said valve means to operate the latter, a hydraulic reaction device having a chamber connected directly and solely to said master cylinder and a piston exposed to pressures in said chamber to be subjected to pressures therein corresponding to pressures in said master cylinder, said piston having mechanical connection with said manually operable means to transmit reaction pressures from said chamber to said manually operable means.

4. A power unit according to claim 3 wherein said manually operable means, upon a failure of said valve means to establish differential pressures in said motor, engages said plunger of said master cylinder to transmit direct forces thereto to generate pressures in said master cylinder.

5. A power unit according to claim 3 wherein said manually operable means includes a pedal mounted to turn about a fixed pivot, said manually operable means further including a valve-operating control rod connected to said pedal at a point spaced substantially from said fixed pivot, said mechanical connection between said piston and said manually operable means comprising a device engaging at one end against said piston and at its other end against said pedal between said fixed pivot and the point of connection of said pedal with said control rod.

6. A power unit according to claim 3 wherein said manually operable means includes a pedal mounted to turn about a fixed pivot, said manually operable means further including a valve-operating control rod connected to said pedal at a point spaced substantially from said fixed pivot, said mechanical connection between said piston and said manually operable means comprising a device engaging at one end against said piston and at its end against said pedal between said fixed pivot and the point of connection of said pedal with said control rod, said control rod being coaxial with said master cylinder plunger and being mechanically engageable therewith to transmit direct pedal forces thereto upon a failure of said valve mechanism to establish differential pressures in said motor.

7. In a power unit to produce hydraulic pressure for hydraulic brakes, a differential fluid pressure operable motor, a valve mechanism for controlling pressures in said motor, manually operable means connected to said valve mechanism to operate it, a master cylinder having coaxial bores of different diameters and plungers of respectively corresponding diameters movable in said bores and connected to each other and to said motor, said smaller bore forming with said smaller plunger a first hydraulic pressure chamber, the said larger bore forming with said larger plunger a second hydraulic pressure chamber, an accumulator comprising a bore having a piston therein biased toward one end thereof, such end of such accumulator bore communicating with said second chamber to receive fluid therefrom when pressure in said first chamber is above a predetermined point, a passage, including a valve seat, normally communicating between said end of said accumulator bore and said first chamber, and a valve in said passage spring biased toward said seat, said accumulator piston having a projection normally holding said valve open whereby said end of said accumulator bore normally communicates with said first chamber, pressure in said one end of said accumulator bore, when above a predetermined point, moving said piston whereby said valve closes.

8. In a power unit to produce hydraulic pressure for hydraulic brakes, a differential fluid pressure operable motor, a valve mechanism for controlling pressures in said motor, manually operable means connected to said valve mechanism to operate it, a master cylinder having coaxial bores of different diameters and plungers of respectively corresponding diameters movable in said bores and connected to each other and to said motor, said smaller bore forming with said smaller plunger a first hydraulic pressure chamber, the larger bore forming with the larger plunger a second hydraulic chamber, said master cylinder being constructed to provide for the flow of fluid from said second chamber to said first chamber until pressure in said first chamber reaches a predetermined point and then to cut off such flow, and an accumulator comprising a bore having a piston therein spring biased toward one end thereof, such end of said accumulator bore communicating with said second chamber and being adapted to receive fluid from said second chamber when pressure in said first chamber is above said predetermined point, said end of said accumulator bore communicating with said chamber to bypass fluid from said second chamber into said first chamber, and means for closing such communication when pressure in said first chamber rises above said predetermined point.

9. In a power unit to produce hydraulic pressure for hydraulic brakes, a differential fluid pressure operable motor, a valve mechanism for controlling pressures in said motor, manually operable means connected to said valve mechanism to operate it, a master cylinder having coaxial bores of different diameters and plungers of respectively corresponding diameters movable in said bores and connected to each other and to said motor, said smaller bore forming with said smaller plunger a first hydraulic pressure chamber, the larger bore forming with the larger plunger a second hydraulic chamber, said master cylinder being constructed to provide for the flow of fluid from said second chamber to said first chamber until pressure in said first chamber reaches a predetermined point and then to cut off such flow, an accumulator comprising a bore having a piston therein spring biased toward one end thereof, such end of said accumulator bore communicating with said second chamber and being adapted to receive fluid from said second chamber when pressure from said first chamber is above said predetermined point, and a reaction device having a reaction chamber and a reaction piston subject to pressure in such chamber and having mechanical engagement with said manually operable means, said reaction chamber communicating solely with said first chamber.

10. A power unit according to claim 9 provided with means for delaying the transmission of pressure in said reaction chamber to said manually operable means until such pressure increases above a predetermined point.

11. A power unit according to claim 9 wherein said manually operable means comprises a pedal and a control rod connected thereto and movable coaxially of said motor to operate said valve mechanism, a member for transmitting force from said reaction piston to said pedal and having lost motion connection therebetween within the limits of which said pedal is movable to operate said valve mechanism, and a counter-reaction spring opposing movement of said reaction piston so that reaction forces are not transmitted to said pedal until pressure in said reaction chamber increases above a predetermined point.

References Cited by the Examiner

UNITED STATES PATENTS

| | | | |
|---|---|---|---|
| 2,637,977 | 5/1953 | Seppmann | 60—54.6 |
| 2,820,344 | 1/1958 | Stelzer | 60—54.6 |
| 2,905,152 | 9/1959 | Ingres | 60—54.6 X |
| 2,948,262 | 8/1960 | Gratzmuller | 60—51 X |
| 3,034,301 | 5/1962 | Vick | 60—54.6 |

FOREIGN PATENTS 480,045   4/1953   Italy.

JULIUS E. WEST, *Primary Examiner.*

EDGAR W. GEOGHEGAN, *Examiner.*